(12) United States Patent
Powell et al.

(10) Patent No.: US 9,428,069 B2
(45) Date of Patent: Aug. 30, 2016

(54) SYSTEMS AND METHODS FOR EFFICIENTLY CHARGING POWER RECOVERY CONTROLLER

(71) Applicant: Colorado Energy Research Technologies, LLC, Englewood, CO (US)

(72) Inventors: Wayne J. Powell, Centennial, CO (US); Robert D. Boehmer, Centennial, CO (US); Lee L. Johnson, Littleton, CO (US)

(73) Assignee: Colorado Energy Research Technologies, LLC, Sheridan, CO (US)

( * ) Notice: Subject to any disclaimer, the term of this patent is extended or adjusted under 35 U.S.C. 154(b) by 221 days.

(21) Appl. No.: 14/229,236

(22) Filed: Mar. 28, 2014

(65) Prior Publication Data

US 2014/0210398 A1  Jul. 31, 2014

Related U.S. Application Data

(63) Continuation-in-part of application No. 14/161,485, filed on Jan. 22, 2014, now Pat. No. 8,917,055, which is a continuation of application No. 14/140,780, filed on Dec. 26, 2013, which is a continuation-in-part of (Continued)

(51) Int. Cl.
*H02J 7/14* (2006.01)
*B60L 11/18* (2006.01)
(Continued)

(52) U.S. Cl.
CPC .......... *B60L 11/1811* (2013.01); *H02J 7/0055* (2013.01); *H02J 7/0093* (2013.01);
(Continued)

(58) Field of Classification Search
CPC ..................................... Y02T 10/7005
USPC .......................................... 320/104
See application file for complete search history.

(56) References Cited

U.S. PATENT DOCUMENTS 3,660,738 A   5/1972  Anderson et al.
3,753,059 A *  8/1973  Berman ................. H02P 7/298
                                                    318/139

(Continued)

FOREIGN PATENT DOCUMENTS

CN   102382908   3/2012
EP   2479059     7/2012

(Continued)

OTHER PUBLICATIONS

Kim, Y., "Ultracapacitor Technology Powers Electronic Circuits", Power Electronics Technology, Oct. 2003, pp. 34-39.

*Primary Examiner* — Suresh Memula
(74) *Attorney, Agent, or Firm* — Fish & Tsang LLP

(57) ABSTRACT

The inventive subject matter provides systems and methods for efficiently charging a battery of a vehicle using a regenerative braking system. In one aspect of the invention, the battery charging system includes a regenerative braking system that is configured to convert mechanical energy from braking of the vehicle into electrical energy. The battery charging system also includes a bank of capacitors that is configured to store the electrical energy generated by the regenerative braking system. The battery charging system also includes a circuit that is configured to feed into the battery at least a portion of the electrical energy stored in the bank of capacitors as a series of current pulses at a frequency that corresponds to a resonant frequency of the battery. The series of pulses includes constructive resonant ringing that is constructive with respect to charging the battery.

28 Claims, 5 Drawing Sheets

Related U.S. Application Data application No. 13/726,828, filed on Dec. 26, 2012, now Pat. No. 8,669,738.

(60) Provisional application No. 61/806,350, filed on Mar. 28, 2013, provisional application No. 61/806,302, filed on Mar. 28, 2013.

(51) Int. Cl.
    *H02J 7/00*     (2006.01)
    *H02J 7/34*     (2006.01)

(52) U.S. Cl.
    CPC .......... *H02J 7/1415* (2013.01); *H02J 7/1492* (2013.01); *H02J 7/345* (2013.01); *H02J 2007/0096* (2013.01); *Y02T 10/7005* (2013.01); *Y02T 10/7011* (2013.01); *Y02T 10/7022* (2013.01)

(56) References Cited

U.S. PATENT DOCUMENTS

| | | | |
|---|---|---|---|
| 3,790,816 A * | 2/1974 | Berman | H02P 7/281 180/65.8 |
| 4,355,275 A | 10/1982 | Anglin | |
| 4,637,835 A | 1/1987 | Nagle | |
| 5,296,797 A | 3/1994 | Bartlett | |
| 5,406,126 A * | 4/1995 | Hadley | B60K 6/26 290/14 |
| 5,411,816 A | 5/1995 | Patino | |
| 5,446,365 A | 8/1995 | Nomura et al. | |
| 5,633,574 A | 5/1997 | Sage | |
| 5,650,713 A | 7/1997 | Takeuchi et al. | |
| 5,783,929 A | 7/1998 | Taricco | |
| 5,871,368 A | 2/1999 | Erdner et al. | |
| 5,884,086 A | 3/1999 | Amoni et al. | |
| 5,891,590 A | 4/1999 | King | |
| 5,969,750 A | 10/1999 | Hsieh et al. | |
| 6,006,088 A | 12/1999 | Couse | |
| 6,140,800 A | 10/2000 | Peterson | |
| 6,229,287 B1 | 5/2001 | Ferris et al. | |
| 6,239,578 B1 | 5/2001 | Schnell et al. | |
| 6,507,172 B2 | 1/2003 | Sherman | |
| 6,531,845 B2 | 3/2003 | Kerai et al. | |
| 6,534,955 B1 | 3/2003 | Wae | |
| 6,633,932 B1 | 10/2003 | Bork et al. | |
| 6,663,420 B1 | 12/2003 | Xiao | |
| 6,670,788 B2 | 12/2003 | Prabhu et al. | |
| 6,741,064 B2 | 5/2004 | Liu et al. | |
| 6,798,173 B2 | 9/2004 | Hsu | |
| 6,891,355 B2 | 5/2005 | Kernahan | |
| 6,928,310 B2 | 8/2005 | Lee | |
| 6,936,936 B2 | 8/2005 | Fischer et al. | |
| 6,946,817 B2 | 9/2005 | Fischer et al. | |
| 6,980,204 B1 | 12/2005 | Hawkins et al. | |
| 7,301,308 B2 | 11/2007 | Aker et al. | |
| 8,120,324 B2 | 2/2012 | Fee et al. | |
| 8,188,718 B2 | 5/2012 | Fee et al. | |
| 8,207,707 B2 | 6/2012 | Hart et al. | |
| 8,237,402 B2 | 8/2012 | Julstrom et al. | |
| 2008/0265842 A1 | 10/2008 | Hart et al. | |
| 2009/0115535 A1 * | 5/2009 | Takeuchi | G06F 1/025 331/25 |
| 2009/0224720 A1 * | 9/2009 | Oyobe | B60L 11/18 318/801 |
| 2009/0309553 A1 | 12/2009 | Marinka-Toth et al. | |
| 2010/0167368 A1 | 7/2010 | Kawasaki | |
| 2012/0168242 A1 | 7/2012 | Kulatunga | |

FOREIGN PATENT DOCUMENTS

| | | |
|---|---|---|
| JP | 100309002 | 11/1998 |
| WO | 03/088447 | 10/2003 |
| WO | 2009/005168 | 1/2009 |
| WO | 2009/035611 | 3/2009 |
| WO | 2012/116201 | 8/2012 |

* cited by examiner

SYSTEMS AND METHODS FOR EFFICIENTLY CHARGING POWER RECOVERY CONTROLLER

This application claims the benefit of U.S. Provisional Application No. 61/806,350, filed Mar. 28, 2013. This application is also a continuation-in-part of U.S. patent application Ser. No. 14/161,485, filed on Jan. 22, 2014, which is a continuation of U.S. patent application Ser. No. 14/140,780, filed on Dec. 26, 2013, which claims the benefit of U.S. Provisional Application No. 61/806,302, filed Mar. 28, 2013. U.S. patent application Ser. No. 14/140,780 also is a continuation-in-part of U.S. patent application Ser. No. 13/726,828, filed on Dec. 26, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is battery charging techniques.

BACKGROUND

The following description includes information that may be useful in understanding the present invention. It is not an admission that any of the information provided herein is prior art or relevant to the presently claimed invention, or that any publication specifically or implicitly referenced is prior art.

Traditional techniques of charging batteries are inefficient. In particular, when it pushes a current through a battery, only a small amount of the current (i.e., charge) is retained within the battery while most of it is converted into heat energy. As such, the traditional battery charging techniques can take hours to provide a full charge to a battery or battery pack. They are also limited to charging non-primary (i.e., rechargeable) batteries such as Nickel Metal Hydride (NiMH) batteries or Lithium Ion (Li-Ion) batteries. In addition, once batteries fall below a certain capacity and/or voltage, they are considered "dead" and are not recoverable using the traditional battery chargers that are available on the market.

Efforts have been made to improve the efficiency of battery chargers. For example, pulse charging, in which a series of current pulses is fed to the battery, has been known to be more effective than traditional battery charging techniques. For lead-acid based batteries, the current pulses are also known to break down the sulfation on the plates, which allows the battery to last longer.

With pulse charging, one of the varying factors is the pulse frequency. It is known that batteries usually accept charges most efficiently when being charged with pulses at the batteries' resonant frequencies. U.S. Pat. No. 8,207,707 to Hart et al. issued Jun. 26, 2012, entitled "Method and Apparatus to Provide Fixed Frequency Charging Signals to a Battery At Or Near Resonance" discloses a battery charger with a fixed frequency charging signal at or near the resonant frequency of the battery to be charged.

U.S. Pat. No. 8,120,324 to Fee et al. issued Feb. 2, 2012, entitled "Method and Apparatus to Provide Battery Rejuvenation At Or Near Resonance" also discloses the use of a battery's resonant frequency to rejuvenate the battery that has lost capacity.

While different types of batteries have different resonant frequencies, different charge states of a battery also have slightly different resonant frequencies. International patent publication WO2009/035611 to Fee et al., filed Sep. 12, 2007, entitled "Method and Apparatus to Determine Battery Resonance" discloses a method of determining the resonant frequency of a battery at different charge state so that pulses can be generated at the correct resonant frequency to a battery depending on the battery's charge state.

The above-described techniques have greatly improved the efficiencies of battery charging when compared with traditional charging techniques. Their efficiencies are good enough for charging batteries for small appliances (e.g., AA, AAA batteries). However, existing technologies are still not capable of providing good charge time for large batteries such as electric cars' batteries. For example, Tesla® has reported that its electric car batteries requires four hours to charge from empty to full capacity using a 240 V charger on a 90 A circuit breaker (best scenario) and requires forty-eight hours to charge the same using a 120 V household outlet on a 15 A circuit breaker.

Thus, there is still a need to improve on existing battery charging techniques.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods for charging a battery by providing a series of current pulses through the battery. It is contemplated that feeding, through the battery, the current pulses at a certain frequency that corresponds to the resonant frequency of the battery helps aligning the electrons in the battery for better reception of charge from the direct current.

In one aspect of the inventive subject matter, a method of charging a battery of a vehicle using a regenerative braking system is presented. The method includes the step of converting, by the regenerative braking system, mechanical energy from braking of the vehicle into electrical energy. The method also includes the step of storing the electrical energy in a bank of capacitors. The method includes the step of generating, by a pulsing circuit and from at least a portion of the electrical energy stored in the bank of capacitors, a series of current pulses at a frequency that corresponds to a resonant frequency of the battery. The series of current pulses includes constructive resonant ringing that is constructive with respect to charging the battery. The method further includes the step of feeding the series of current pulses through the battery.

The vehicle in some embodiments is an electric vehicle (e.g., electric cars, electric boat, etc.). The vehicle can also be a hybrid vehicle (e.g., a hybrid car). Furthermore, the battery can include a primary battery. The battery can also include a secondary battery.

In some embodiments the bank of capacitors includes a super-capacitor. In some embodiments, the constructive resonant ringing includes a decaying oscillation of current. In addition, the method can also includes the step of artificially enhancing the constructive resonant ringing in the series of current pulses.

In some embodiments, the method can feed the series of pulses in different intervals. For example, the method can include the step of feeding a first subset of the series of current pulses through the battery at the frequency during a first interval of time. The method can then provides a resting period where no current pulse is fed through the battery. The method also includes the step of feeding a second subset of the series of current pulses through a subsequent, second interval of time.

In some embodiments, the resting period has a duration that spans at least three consecutive current pulses in the first subset of the series of current pulse. In other embodiments, the resting period has a duration that spans at least the same amount of time as the first interval of time.

It is contemplated that operating the series of current pulses at different duty cycles yield different efficiency levels in charging the battery. In some embodiments, the series of current pulses can be operated at no more than 50% duty cycle. When generating the series of current pulses that corresponds to the resonant frequency of the battery, the method of some embodiments generates the current pulses at a frequency that is within 5% of the resonant frequency of the battery. The resonant frequency of the battery is a frequency at which the battery accepts electric charges at an optimal efficiency within a range of frequencies.

Viewed from another perspective, the inventive subject matter provides a battery charging system for charging a battery of a vehicle. The battery charging system includes a regenerative braking system that is configured to convert mechanical energy from braking of the vehicle into electrical energy. The battery charging system also includes a bank of capacitors that is configured to store the electrical energy generated by the regenerative braking system. The battery charging system also includes a circuit that is configured to feed into the battery at least a portion of the electrical energy stored in the bank of capacitors as a series of current pulses at a frequency that corresponds to a resonant frequency of the battery. The series of pulses includes constructive resonant ringing that is constructive with respect to charging the battery.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods for charging a battery by providing a series of current pulses through the battery. It is contemplated that feeding, through the battery, the current pulses at a certain frequency that corresponds to the resonant frequency of the battery helps aligning the electrons in the battery for better reception of charge from the direct current.

Figure 1:
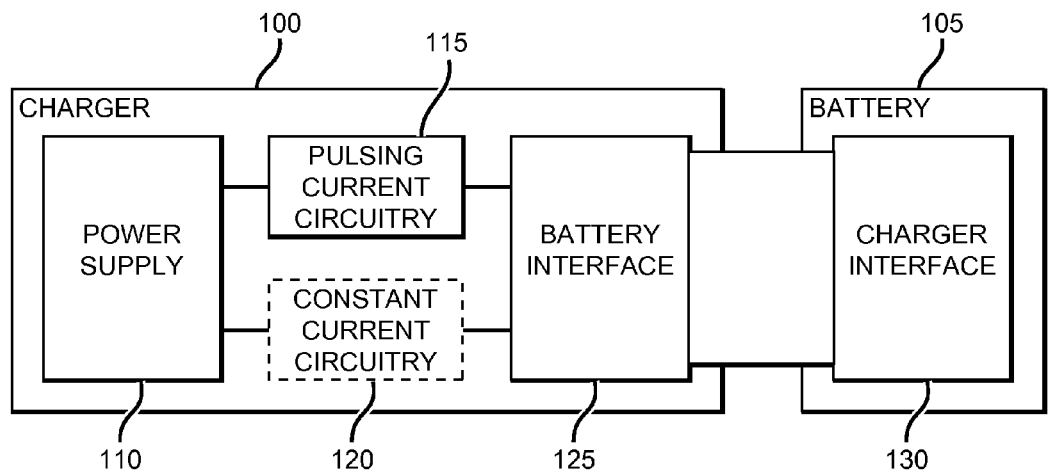
FIG. 1 illustrates the schematic of a battery charger of some embodiments of the invention.

FIG. 1 illustrates an example charger 100 of some embodiments for charging a set of battery cells 105. The charger 100 comprises a power supply 110, an optional constant current circuit 120, a pulsing current circuit 115, and a battery interface 125. The pulsing current circuit 115 is coupled with the power supply 110 and the battery cells 105 and is configured to provide a series of pulsed current to the battery cell. The battery interface 125 comprises conductive materials and is configured to send a charge signal the set of battery cells 105.

In addition to the pulsing current circuit 115, charger 100 of some embodiments can include the constant current circuit 120 that is configured to provide a direct (constant) current to the battery. In some of these embodiments, the constant current and the series of current are simultaneously fed through the battery. It is contemplated that simultaneously feeding the direct current and the series of pulses through the battery can further improve the efficiency of charging the battery.

As used herein, a circuit (or circuitry) is defined as a collection of individual electronic components, such as resistors, transistors, capacitors, inductors and diodes, connected by conductive wires or traces through which electric current can flow. The combination of components and wires in a circuit allows various simple and complex operations that are described herein to be performed.

The set of battery cells 105 has one or more electrochemical cells that convert chemical energy into electrical energy. The electrochemical cells are coupled with a charger interface 130 for receiving a charge signal from charger 100. The battery cells 105 can include a primary battery or a secondary battery. As used herein, a primary battery (or a primary cell) is a battery that is designed to be used once and discarded because the chemical reactions in the primary battery are designed to be not reversible. A secondary battery on the other hand, can be reused by way of re-charging because the chemical reactions in the secondary battery are designed to be reversible.

In some embodiments, the power supply 110 provides a direct current (DC) into the constant current circuit 120 and the pulsing current circuit 115. In some embodiments, the power supply 110 can be another battery. In other embodiments, the power supply 110 can include an alternating current (AC) power source (e.g., a household outlet) that works together with a rectifier (or a converter) to convert the alternating current into a direct current before feeding through the constant current circuit 120 and the pulsing current circuit 115.

The system could also have an adaptor configured to couple the power supply 110, the pulsing current circuit 115, and the optional constant current circuit 120 with the battery cell. The adaptor could comprise a USB interface, a direct clip connector, a proprietary jack, or any variety of polarizing male and female connector for connecting to a battery cell.

Although the adapter could include a power line such as the power line found in a USB port, preferably the charger 100 includes a controller or processor (e.g., an integrated circuit, etc.) that is configured to obtain permission from the data and or control lines to siphon power to the charger. The connection to the charger 100 could also be switched such that the controller or processor could make or break the connection in accordance with instructions received via a user interface of the device. Such instructions could arise from the detection of the onset of a communication over the data line in particular where this is a source of power. It may also be appropriate to break the connection where an additional power direct connection to a LiPo or NiMH battery consisting of any of the following connections including but not limited to a USB interface, direct clip connector, proprietary configured jack and plug modality or any variety of polarizing male and female connections is connected to a dedicated input to the charging circuit. The device could also include means for providing data indicative of the status of a battery connected to the battery charger.

Figure 2:
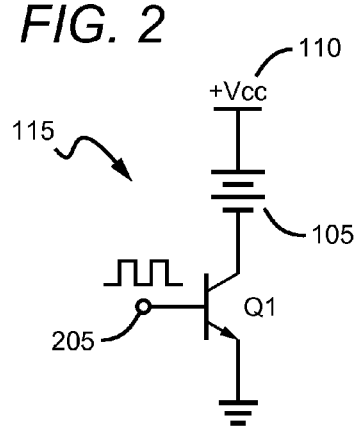
FIG. 2 illustrates the schematic of a pulsing current circuit of some embodiments.

Different embodiments use different techniques and/or components to implement the pulsing current circuit 115. FIG. 2 illustrates a schematic of one example pulsing current circuit 115. As shown, the pulsing current circuit 115 is coupled with the power supply 110 and the battery cells 105. In this example, the pulsing current circuit 115 comprises an oscillator 205 that is configured to provide a series of current pulses to the battery cells 105.

In some embodiments, the oscillator 205 is configured to generate a series of current (electric) pulses from the power supply 110 and feed the series of current pulses through the battery cells 105. The oscillator 205 can include one or more circuitries, such as a transistor, a transistor driver, that work together to take a direct current and generate the series of current pulses. In some embodiments, the oscillator 205 can also include a frequency controller that allows a user (or a controller circuit) to control and/or adjust the frequency of the current pulses that are fed through the battery.

It is contemplated that providing the series of current pulses at different frequencies to charge a battery yields different charging efficiencies. As used herein, the charging efficiency of a battery is defined as the amount of power input that is required to charge a battery from one charge state to another charge state. It is also noted that charging a battery by feeding the current pulses at (or close to, e.g., within 5% of) the battery's "resonant frequency," or its harmonic variations, can yield optimal or near optimal efficiency. As used herein, a resonant frequency is defined as a frequency at which the battery (and any associated circuitry) can be charged with an optimal efficiency within a range of frequencies. In addition, the resonant frequency yields higher charging efficiency than frequencies that are immediately below and above the resonant frequency.

In general, the resonant frequency for a battery can vary depending on the battery's chemistry and the battery's charge state. Different embodiments use different techniques to identify the resonant frequency of a particular battery at a particular charge state. For example, the resonant frequencies can be identified through feeding the battery (while at a particular charge state) with current pulses at different frequencies. One can then measure and record the different charge time to charge the same battery from one charge state to another charge state when supplying the battery with pulses at the different frequencies.

Alternatively, it is contemplated that one can use the circuitry disclosed in International Patent Publication WO 2009/035611 to Fee et al. filed Sep. 11, 2008, entitled "Method and Apparatus to Determine Battery Resonance" ("Fee") to determine the resonant frequency of the battery at its current charge state.

As such, it is contemplated that the oscillator 205 is configured to generate the series of current pulses at (or near) the determined resonant frequency or its harmonic variations of the battery. In some embodiments, the oscillator 205 is configured to generate the series of current pulses at a frequency that is within 5% of the determined resonant frequency (or its harmonic variations) of the battery. In addition, it is also contemplated that the pulsing current circuit 115 can include the circuitry disclosed in Fee so that the pulsing current circuit 115 can dynamically adjust the frequency of the pulses to the different resonant frequencies of the battery at the battery's different charge states during the charging process.

In some embodiments, when generating the series of current pulses to the battery 105, the pulsing current circuit 115 is configured to generate the pulses with constructive resonant ringing. The ringing is oscillation of current (echoes from current pulses) generated by the oscillator 205. These ringing "artifacts" have been perceived to be "noises" and useless in charging batteries. Thus, existing pulse chargers have used different techniques or filters to effectively remove these ringing "artifacts" in order to generate "clean pulses" to charge batteries. However, contrary to what has been widely perceived, it is contemplated herein that these "ringing oscillations" are beneficial to the battery charging process. In particular, it is contemplated that the ringing oscillations of each current pulse allows the electrons in the battery to better realign themselves to prepare for the next pulse, thus further improving the efficiency of the charge. The battery chemistry, density, and physical spacing of the elements can produce adequate variables for different ringing oscillations.

Therefore, the pulsing current circuit 115 in some embodiments is configured to produce the constructive resonant ringing after each current pulse in the series. The ringing is constructive with respect to charging the battery. In other words, the constructive resonant ringing improves the efficiency of charging the battery 105 (i.e., the battery charging efficiency is better with the ringing than without the ringing).

The constructive resonant ringing that occurs after each current pulse decays over time. In some embodiments, the pulsing current circuit 115 comprises an inductor that is configured to artificially enhance the constructing resonant ringing to further improve the efficiency of charging the battery 105.

Figure 3:
FIG. 3 illustrates a comparison between current pulses with constructive resonant ringing and current pulses without constructive resonant ringing.

FIG. 3 illustrates the differences between current pulses with constructive resonant ringing and current pulses without constructive resonant ringing. In particular, FIG. 3 illustrates a view from an oscilloscope that shows two series of pulses, a first series of pulses 305 on the top and a second series of pulses 310 on the bottom.

The first series of pulses 305 is shown to have constructive resonant ringing after each current pulse. That is, each pulse in the first series is followed by a group of decaying ringing oscillation of current in response to the current pulse. As shown, the group of ringing decays over time until it completely dies out. In some embodiments, the pulsing current circuit 115 is configured to produce current pulses that are similar to the first series of pulses 305 as shown in FIG. 3.

By contrast, the second series of pulses 310 (pulses that can be produced by existing pulse chargers) are shown to not include any constructive resonant ringing after each current pulse. As shown, each current pulse comes to a plateau (e.g., plateau 315) at a higher voltage for a period of time and then immediately comes down to flat or almost flat wave (e.g., no voltage or constant low voltage). Although some noise can be seen after each pulse in the second series 310 through the oscilloscopic graph, the noise would not constitute a constructive resonant ringing because the noise does not provide constructive benefits to the charging of the battery 105.

Figure 4:
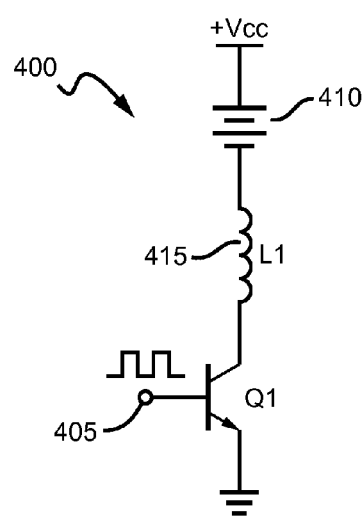
FIG. 4 illustrates the schematic of another example pulsing current circuit that includes an inductor for artificially enhancing the constructive resonant ringing.

FIG. 4 illustrates a schematic of another example pulsing current circuit 400 that includes an inductor for artificially enhancing the constructive resonant ringing. The circuit 400 is almost identical to the pulsing current circuit 115 of FIG. 2 except that the circuit 400 incorporates an inductor 415 that is configured to enhance resonant ringing of the series of pulses. The inductor 415 assists in resonating the battery relative to the physical attributes, as previously noted.

In addition to the constructive resonant ringing, the pulsing current circuit 115 of some embodiments is also configured to provide one or more resting periods to the series of pulses. It is contemplated that applying resting periods between multiple subsets of pulses in the series of current pulses would improve the charging efficiency of the battery. In some embodiments, the pulsing current circuit 115 includes (or work with) an integrated control circuit to apply a first subset of pulses in the series of current pulses to the battery for a first duration of time (e.g., for 30 seconds), then rest for a period of time (e.g., for 30 seconds) in which no current pulse is applied to the battery, and then apply a second subset of the series of current pulses to the battery for another duration of time (e.g., 60 seconds). This process of applying a subset of pulses, then resting for a period of time, and then applying another subset of pulses can repeat until the battery is fully charged. In some embodiments, the pulsing current circuit 115 is configured to apply a resting period at least as long as the time period between two current pulses in the first subset (the subset of pulses immediately preceding the resting period). Preferably, the pulsing current circuit 115 is configured to apply a resting period that is of the same duration as the first series of current pulses (i.e., same duration as the series of current pulses immediately preceding the resting period).

Figure 5:
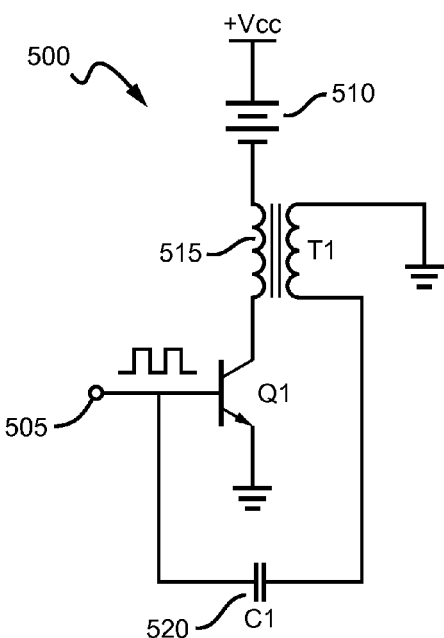
FIG. 5 illustrates the schematic of an alternative pulsing current circuit.

FIG. 5 illustrates yet another example pulsing current circuit 500 of some embodiments for charging batteries. The pulsing current circuit 500 is almost identical to the circuit 400 of FIG. 4 except that the circuit 500 includes a transformer 515 and a capacitor 520. The transformer 515 and capacitor 520 collectively act as a tank circuit and serve as a momentary storage device.

Figure 6:
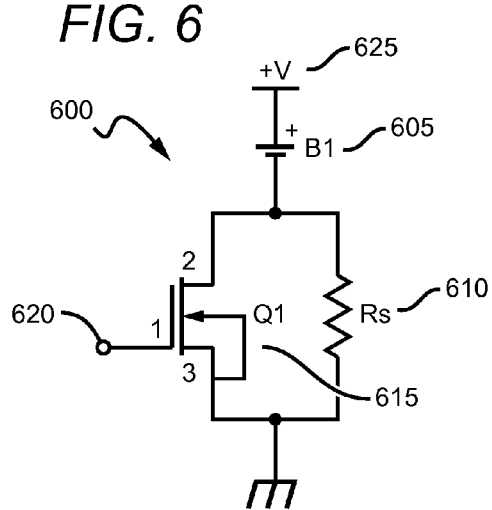
FIG. 6 illustrates the schematic of a battery charging circuit that includes a constant current circuitry and a pulsing current circuitry.

In some embodiments, the constant current circuit 120 can be disposed in parallel with the pulsing current circuit 115 in charging the battery 105. In other embodiments, the constant current circuit 120 and the pulsing current circuit 115 can be integrated to provide a single charging signal to the battery 105. FIG. 6 shows an exemplary charger 600 that combines a constant current with a pulse current to provide a single signal to the battery 605. As shown in the figure, battery 605 is being connected to a power source 625 with positive voltage and the charging circuit. The charging circuit 600 includes a shunt resistor 610 that provides a constant current through the battery 605. The charging circuit 600 also includes a transistor 615 that works with a signal generator 620 to provide current pulses through the battery 605. Specifically, the signal generator 620 is configured to provide a stimulation waveform as input for the transistor 615. The transistor 615 in turn opens and closes the transistor switch in accordance with the stimulation waveform input. When transistor switch 615 is open, low current flows through battery 605 from the power source 625 through battery 605 and the shunt resistor 610 into ground. When transistor switch 615 is closed, high current flows through battery 605 and transistor 615 from power source 625 into ground.

In some embodiments, the signal generator 620 is configured to provide a waveform that corresponds to the resonant frequency of the battery 605. By closing and opening the transistor switch 615 in accordance with the resonant frequency of the battery 605, alternating high and low current at the resonant frequency of the battery 605 is provided through the battery 605.

In an alternative embodiment, an optimal resonance detector, such as the system disclosed in WO2009/035611 (Fee), could be used to alter the frequency of the stimulation waveform as charges to ensure that the pulse is generally sent at the resonant frequency. In a preferred embodiment, the optimal resonance detector measures an optimal resonance of battery 605 every hour, every 30 minutes, every 10 minutes, every 5 minutes, every minute, or even every 30 seconds to adjust the frequency of the stimulation waveform.

Figure 7:
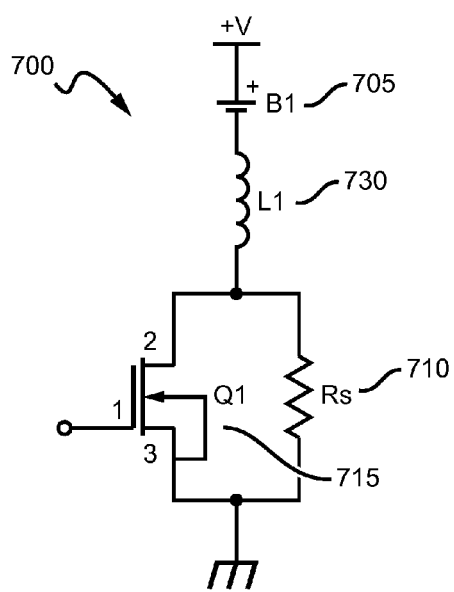
FIG. 7 illustrates the schematic of another battery charging circuit that includes a constant current circuitry and a pulsing current circuitry.

FIG. 7 shows the schematic of another exemplary battery pulse charger 700. Charger 700 is almost identical as charger 600 of FIG. 6, except that charger 700 includes an additional inductor 730 in the circuit. As shown, an inductor 730 is disposed on the circuit between battery 705 and the resistor 710 and transistor 715. The electric field generated by inductor 730 could oscillate with the resonant frequency applied by the stimulation waveform, thereby generating the constructive resonant ringing as described above to further improve the charging efficiency.

Such exemplary configurations are designed to charge the battery with both a constant voltage and a simultaneous resonating pulse. Portable equipment batteries could also be charged via the a battery connector by using either on board or off board charging systems via an existing connectivity port or to any other type of battery charging device.

A communications port could also be coupled with the charging circuit where the charging circuit is connected to at least one data line and/or control line of the communications port, and where power is received by the circuit during operation of any data line and/or control line of the communications port. By using such a communications port, it could be possible to deliver power to a battery charging circuit while a device powered by the battery is communicating using the same line. Such communication activity could include the transfer of data and/or control signals. A switch could also be provided to control the delivery of power to the charging circuit where the transmission conditions of the port dictate.

According to another aspect of the present invention, a LiPo or NiMH battery could be charged by directly connecting the battery to a variety of connectors, such as a USB interface, direct clip connector, proprietary configured jack and plug modality and/or any variety of polarizing male and female connections that are used or will be used to charge a battery-powered device containing a communications port. The connector could include such devices as those disclosed in FIGS. 6 and 7 to charge the battery while control signals are being sent through the connector to a connected device.

Any such connector could have a compatible plug and/or a dc power supply of correct voltage with a dual output consisting of a pulsed amplifier at resonant frequencies with a shunted dc output consisting of dc voltage and current (20-70%) and frequency resonant charge (80-30%), respectively. Such a DC converter charging circuit could insert resonant frequency oscillations and direct current into the battery at the same time as discussed above.

Figure 8A:
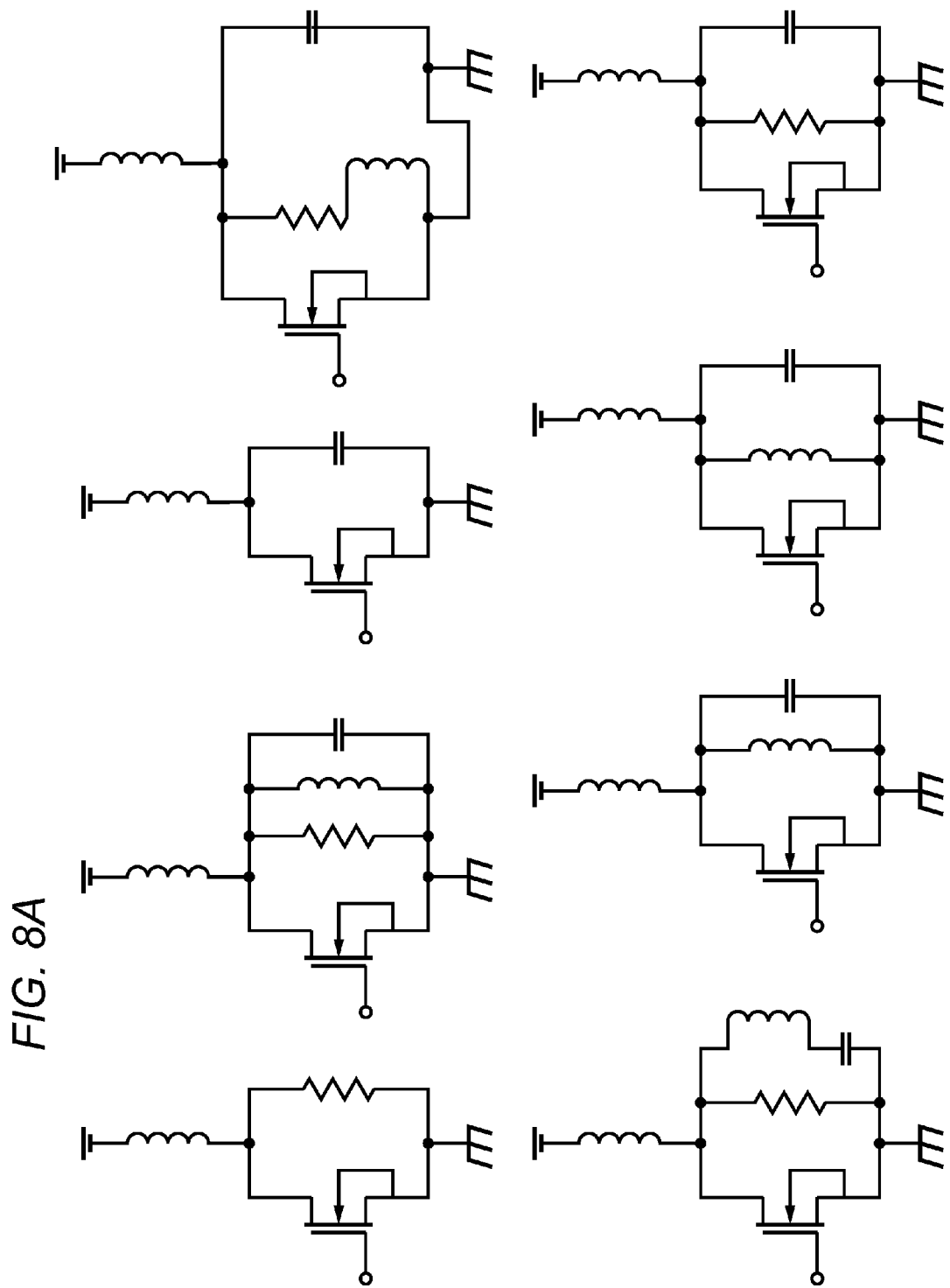
FIGS. 8A and 8B illustrate the schematic of alternative exemplary configurations for a battery charging circuit of some embodiments.
Figure 8B:
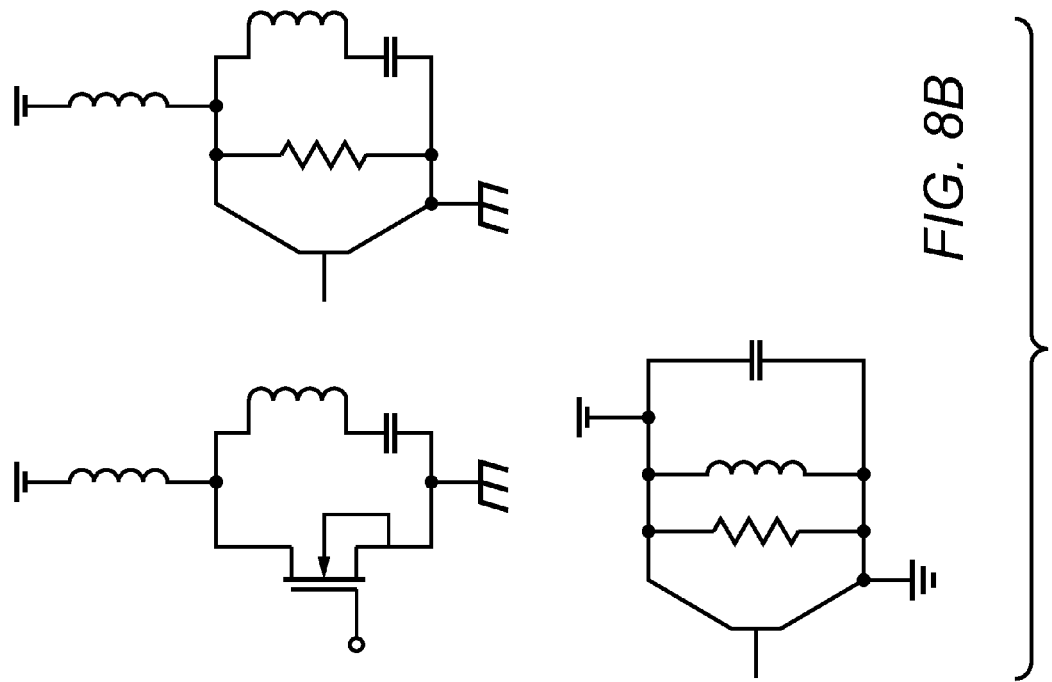

FIGS. 8A and 8B shows alternative exemplary configurations showing ways a battery charger could convey both a pulsed charge and a constant charge to a battery. As shown, a resistor or an inductor could be coupled in series with the battery, in parallel with the battery, or both, depending on the battery properties.

Figure 9:
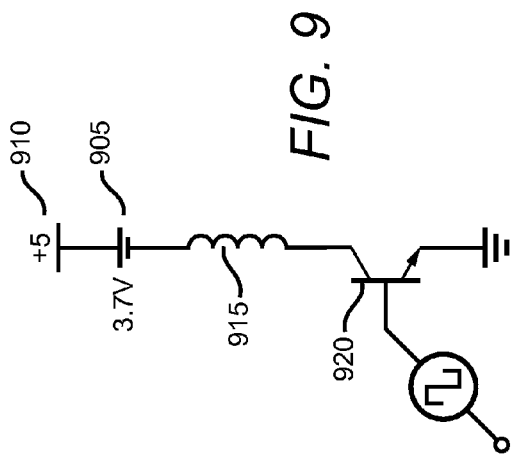
FIG. 9 illustrates the schematic of a circuit configured to rejuvenate a battery.

Alternative circuit embodiments specialized in performing different functions related to the battery charging process are also contemplated. FIGS. 9-12 illustrate four different battery charging circuits that are optimized to perform different battery charging functions. Specifically, FIG. 9 illustrates a circuit 900 that is optimized to only rejuvenate a battery (instead of charging the battery). The process of rejuvenating a battery can be applied to any battery before the charging process. In some embodiments, the rejuvenating process using the circuit 900 can even revive a battery that has lost capacity (e.g., dead or close to dead). A battery that has lost capacity cannot hold charge according to its manufacture specification. As shown in FIG. 9, the circuit 900 connects to a power source 910 and battery cell 905. The circuit 900 includes an oscillator 920 (that can be implemented according to the method described herein) that produces the current pulses and an inductor 915 that artificially enhances the constructive resonant ringing of the pulses in the same manner as described above.

The circuit 900 is configured to provide steady low current pulses (e.g., 10 mA-500 mA) to the battery 905 to rejuvenate the battery 905. Preferably, the circuit 900 is configured to provide a current of less than 500 mA to the battery 905. Even more preferably, the circuit 900 is configured to provide a current of less than 200 mA to the battery 905. After applying the steady low current pulses to the battery 905, the battery 905 should begin to accept charges better than before the rejuvenating. In some embodiments, the battery can regain full capacity after the rejuvenation.

Figure 10:
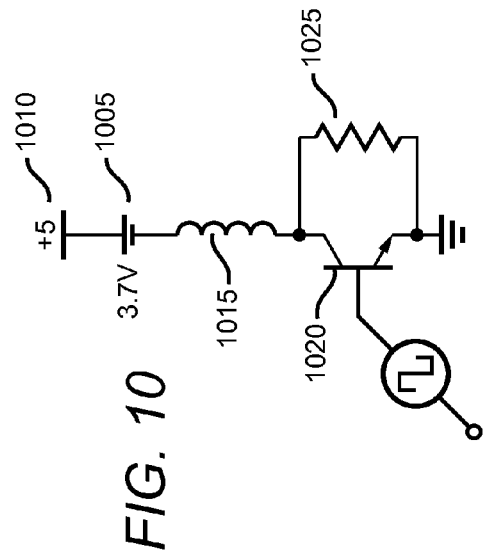
FIG. 10 illustrates the schematic of a battery charging circuit configured to charge the battery at a rapid rate.

FIG. 10 illustrates another circuit 1000 for charging a battery 1005 at a rapid rate (i.e., rapid charging). The process of rapidly charging a battery can be applied to any battery when the battery needs to be charged up quickly. As shown in FIG. 10, the circuit 1000 connects to a power source 1010 and battery cell 1005. The circuit 1000 includes an oscillator 1020 (that can be implemented according to the method described herein) that produces the current pulses and an inductor 1015 that artificially enhances the constructive resonant ringing of the pulses in the same manner as described above. The circuit 1000 also includes a resister 1025 that runs parallel with the oscillator 1020 and acts as a shunt for generating higher current (e.g., 3,000 mA-20,000 mA) than the circuit 900 in FIG. 9. Preferably, the circuit 1000 is configured to provide a current of more than 3,000 mA to the battery 1005. Even more preferably, the circuit 1000 is configured to provide a current of more than 10,000 mA to the battery 1005.

The circuit 1000 is configured to provide steady high current pulses to the battery 1005 to rapidly charge the battery 1005.

Figure 11:
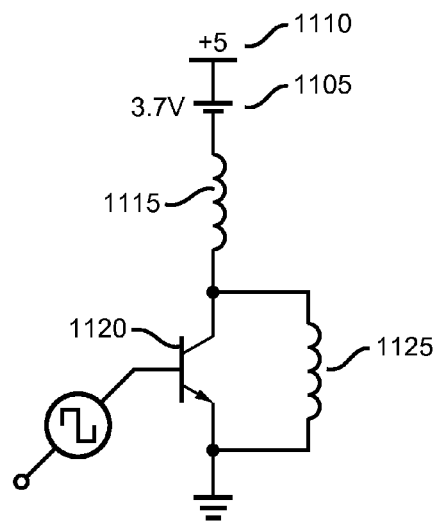
FIG. 11 illustrates the schematic of a battery charging circuit configured to simultaneously rejuvenate the battery and charge the battery at a moderate rate.

FIG. 11 illustrates another circuit 1100 for simultaneously charging a battery 1105 at a moderate rate and rejuvenating the battery 1105. The process of charging and rejuvenating a battery can be applied to any battery when the battery has lost capacity (e.g., is dead or near dead). The circuit 1100 is almost identical to the circuit 1000 from FIG. 10, except that circuit 1100 uses an inductor 1125 (rather than a resistor) as a shunt. As shown, the circuit 1100 includes a second inductor 1125 that runs parallel to the oscillator 1120 for generating moderate current (e.g., 500 mA-3,000 mA) to the battery 1105. Preferably, the circuit 1100 is configured to provide a current of no less than 500 mA to the battery 1105. Even more preferably, the circuit 1100 is configured to provide a current of less than 3,000 mA to the battery 1105.

Figure 12:
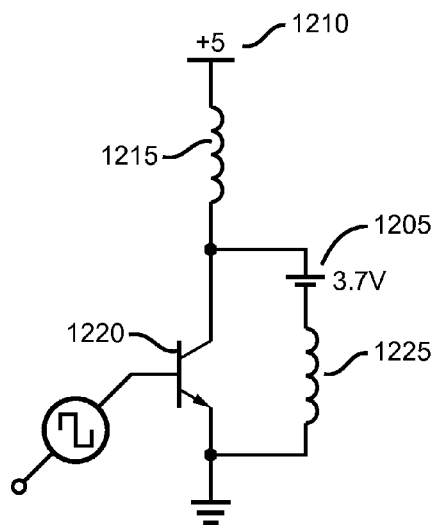
FIG. 12 illustrates the schematic of another battery charging circuit configured to simultaneously rejuvenate the battery and charge the battery at a moderate rate.

FIG. 12 illustrates another circuit 1200 for simultaneously charging a battery 1205 and rejuvenating the battery 1205. The process of charging and rejuvenating a battery can be applied to any battery when the battery has lost capacity (e.g., is dead or near dead). The circuit 1200 is almost identical to the circuit 1100 from FIG. 11, except that circuit 1200 uses the battery 1205 in addition to the inductor 1225 as a shunt. As shown, the circuit 1200 includes a second inductor 1225 that runs parallel to the oscillator 1120 for generating moderate current (e.g., 500 mA-3,000 mA) to the battery 1105. Preferably, the circuit 1200 is configured to provide a current of no less than 500 mA to the battery 1205. Even more preferably, the circuit 1200 is configured to provide a current of less than 3,000 mA to the battery 1205.

Figure 13A:
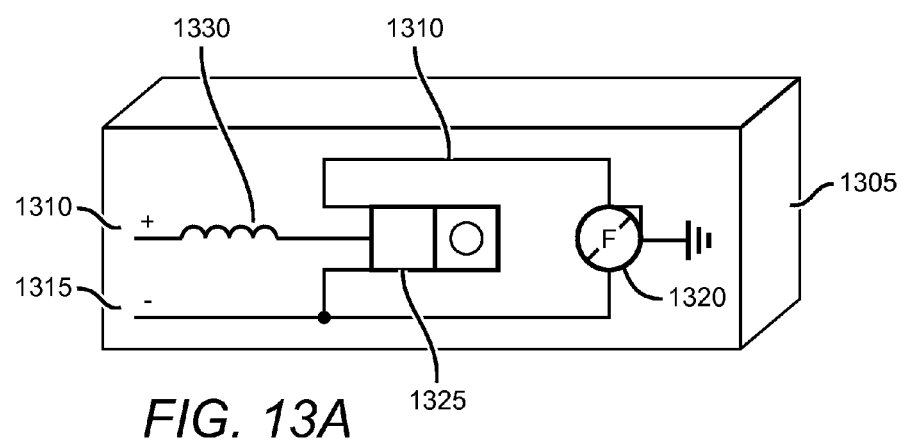
FIGS. 13A and 13B illustrate the schematic of a battery charging circuit that can be integrated within the battery housing.
Figure 13B:
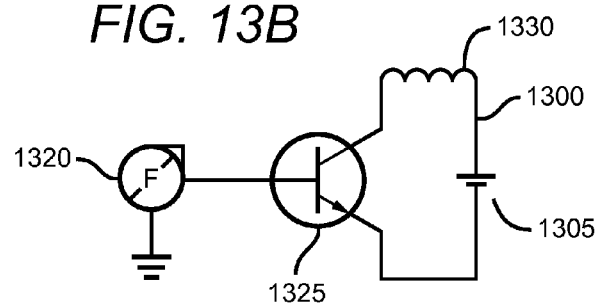

It is conceived that the circuit 1200 can be even integrated within (or attached to) a battery, such that the battery can receive the same benefits (efficiency and rejuvenation) as described above when it is being charged/recharged using a generic battery charger. FIGS. 13A and 13B illustrates schematic circuits of such an embodiment. Specifically, FIG. 13A illustrates a circuit 1300 that can be embedded within a battery 1305. As shown, one end of the circuit 1300 is connected to the cathode 1310 of the battery and the other end of the circuit 1300 is connected to the anode 1315 of the battery.

The circuit 1300 includes a function generator 1320, a transistor/MOSFET 1325, and an inductor 1330. The function generator 1320 supplies a waveform to the transistor 1325 to produce a series of current pulses. In some embodiments, the function generator 1320 is configured to supply a waveform that corresponds to the resonant frequency of the battery 1305 such that the series of current pulses is fed through the battery 1305 at a frequency that corresponds to the resonant frequency of the battery 1305. The inductor 1330 is configured to artificially enhance the constructive resonant ringing as described above. FIG. 13B illustrates a schematic of the circuit 1300.

As used herein, a resonant frequency is defined as a frequency at which the battery (and any associated circuitry) can be charged with an optimal efficiency within a range of frequencies. In addition, the resonant frequency yields higher charging efficiency than frequencies that are immediately below and above the resonant frequency. In some embodiments, the second circuit comprises a pulsed current circuit disclosed in U.S. Provisional patent application Ser. No. 13/726,828 to Powell entitled "Power Recovery Controller", filed Dec. 26, 2012, which is herein incorporated by reference in its entirety. In some embodiments, each current pulse in the series comprises a main pulse and a group of ringing decaying pulses.

In some embodiments, the series of current pulses and the constant current can be combined together as a single charging signal to be fed through the battery.

In some embodiments, the system also comprises an adaptor configured to couple the power source, the first circuit, and the second circuit with the battery cell. The adaptor can comprise a USB interface, a direct clip connector, a proprietary jack, or any variety of polarizing male and female connector for connecting to a battery cell.

Although the port may include a power line such as is found, for example, in a USB port, preferably the charging circuit obtains permission from the data and or control lines. Conveniently, the connection to the charging circuit is switched such that the controller or processor may make or break the connection in accordance with instructions received via a user interface of the device. Such instructions could arise from the detection of the onset of a communication over the data line in particular where this is a source of power. It may also be appropriate to break the connection where an additional power direct connection to a LiPo or NiMH battery consisting of any of the following connections including but not limited to a USB interface, direct clip connector, proprietary configured jack and plug modality or any variety of polarizing male and female connections is connected to a dedicated input to the charging circuit. The device may also include means for providing data indicative of the status of a battery connected to the battery charger.

This configuration is designed to resonate and charge the battery with a direct current input simultaneously. This method is designed to charge portable equipment batteries via the portable equipments battery connector with either on board or off board charging systems via existing connectivity or to any battery charging device.

In accordance with a further aspect of the invention, there is provided a battery powered device including a communications port and a charging circuit connectable to a battery, the charging circuit being connected to at least one data and/or control line of said port, whereby power is received by said circuit during operation of said at least one line.

Particularly it is possible to deliver power to a battery charging circuit during communication activity between the device and a further device connected via suitable cabling thereto. Such communication activity may include the transfer of data and/or control signals. A switch may be provided to control the delivery of power to the charging circuit where the transmission conditions of the port dictate.

According to another aspect of the present invention, there is provided a method with direct connection to a LiPo or NiMH battery consisting of any of the following connections including but not limited to a USB interface, direct clip connector, proprietary configured jack and plug modality or any variety of polarizing male and female connections charging a battery powered device containing a communications port, said device further including a resonant and shunting charging circuit connectable to a battery, the method comprising connecting said charging circuit to at least one data and/or control line during delivery of data and/or control signals to said port whereby power is supplied from said at least one line to the charging circuit.

All of which are composed of a compatible plug, a dc power supply of correct voltage with a dual output consisting of a pulsed amplifier at resonant frequencies with a shunted dc output consisting of dc voltage and current (20-70%) and frequency resonant charge (80-30%) Said DC converter charging circuit inserting resonant frequency oscillations and direct current into the battery at the same time.

Cooperating with a Regenerative Braking System to Charge a Battery

The battery charging methodology as disclosed herein can be used in many different battery charging applications. One such application is to use the charger as described above in a battery powered vehicle (e.g., electric or hybrid vehicle). In order to conserve energy, it is known that many of these battery powered vehicle use a regenerative braking system to recharge the battery of the vehicle.

Figure 14:
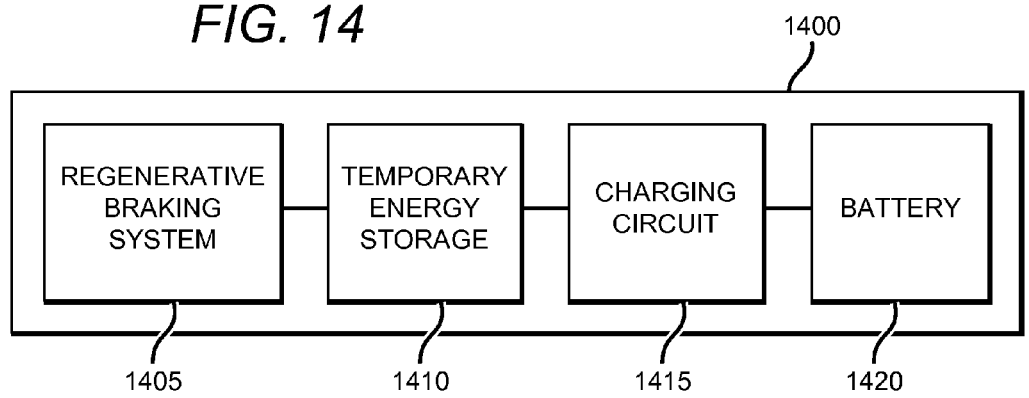
FIG. 14 illustrates a battery charging system specifically for charging batteries of a vehicle.

FIG. 14 illustrates an example of a vehicle battery charging system 1400 that cooperates with a regenerative braking system to recharge the battery of a vehicle. The battery charging system 1400 includes a regenerative braking system 1405, a temporary energy storage 1410, a charging circuit 1415, and a battery 1420. The battery 1420 can include as many cells as one desires in order to power the motor of the vehicle.

The regenerative braking system 1405 is an energy recovery mechanism which slows a vehicle down by converting its kinetic energy into electrical energy. The electrical energy will then be used to re-charge the battery for powering the vehicle. It is noted that the electrical energy generated by the regenerative braking system 1405 can come in bursts. That is, a lot of electrical energy can be generated in a short period of time when the vehicle is braking, and no energy is generated when the vehicle is not braking. It is also noted that batteries are generally not very receptive to large amount of electricity all at once. Therefore, the battery charging system 1400 of some embodiments includes a temporary energy storage 1410 for temporarily storing the electrical energy before being released to charge the battery 1420.

In some embodiments, the temporary energy storage 1410 can comprise a bank of capacitors. Preferably, the temporary energy storage 1410 comprises a bank of super capacitors. The regenerative braking system 1405 in some embodiments includes an alternator that takes energy from the rotor moving to generate electricity. One side effect of this transformation of energy is the slowing down of the vehicle. The battery charging system 1400 stores all of the electrical energy from the regenerative braking system 1405 in the temporary energy storage 1410 before feeding through the battery 1420.

Temporarily storing the electrical energy in the temporary energy storage 1410 before feeding to the battery 1420 prevents bursts of electricity to be directed to the battery 140 all at once. Instead, the temporary energy storage 1410 allows electricity to be built up before slowly feeding to the battery 1420 at a pace that is optimal to efficiently charging the battery. As efficiency improves, less electricity is being wasted.

In some embodiments, the battery charging system 1400 includes a charging circuit 1415 configured to manage the pace and the manner in which electricity is fed through the battery 1420. In some of these embodiments, the charging circuit 1415 can include a charger 100 of FIG. 1. Thus, the charging circuit 1415 of some embodiments can include a pulsing current circuitry 115 configured to generate a series of current pulses from at least a portion of electrical energy that is stored in the temporary energy storage 1410. As mentioned above, the series of pulses is generated at a frequency that corresponds to a resonant frequency (e.g., within 5% of the resonant frequency) of the battery 1420. The charging circuit 1415 is also configured to feed the series of current pulses through the battery 1420.

Optionally (but not necessarily), the charging circuit 1415 can also include the constant current circuitry 120. In these embodiments, the charging circuit 1415 can simultaneously provide a constant current and the series of current pulses through the battery 1420.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of charging a battery of a vehicle using a regenerative braking system, comprising:
   converting, by the regenerative braking system, mechanical energy from braking of the vehicle, into electrical energy;
   storing the electrical energy in a bank of capacitors;
   generating, by a pulsing circuit and from at least a portion of the electrical energy stored in the bank of capacitors, a series of current pulses at a frequency corresponding to a resonant frequency of the battery, wherein the series of current pulses comprises constructive resonant ringing that is constructive with respect to charging the battery; and
   feeding the series of current pulses through the battery.

2. The method of claim 1, wherein the bank of capacitors comprises a super-capacitor.

3. The method of claim 1, wherein the vehicle is an electric vehicle.

4. The method of claim 1, wherein the vehicle is a hybrid vehicle.

5. The method of claim 1, wherein the constructive resonant ringing comprises a decaying oscillation of current.

6. The method of claim 5, further comprising artificially enhancing the constructive resonant ringing in the series of current pulses.

7. The method of claim 1, wherein the battery comprises a primary battery.

8. The method of claim 1, wherein the battery comprises a secondary battery.

9. The method of claim 1, wherein feeding the series of current pulses comprises:
   feeding a first subset of the series of current pulses through the battery at the frequency during a first interval of time;
   providing a resting period where no current pulse is fed through the battery; and
   feeding a second subset of the series of current pulses through the battery at the resonant frequency during a subsequent, second interval of time.

10. The method of claim 9, wherein the resting period has a duration that spans at least three consecutive current pulses in the first subset of the series of current pulses.

11. The method of claim 9, wherein the resting period has a duration that spans at least the same amount of time as the first interval of time.

12. The method of claim 1, wherein the series of current pulses is operated at a duty cycle of no more than 50%.

13. The method of claim 1, wherein feeding the series of current pulses comprises feeding the pulses at a frequency that is within 5% of the resonant frequency of the battery.

14. The method of claim 13, wherein the resonant frequency of the battery is a frequency at which the battery accepts electric charges at an optimal efficiency within a range of frequencies.

15. A battery charging system for charging a battery of a vehicle, comprising:
   a regenerative braking system configured to convert mechanical energy from braking of the vehicle into electrical energy;
   a bank of capacitors configured to store the electrical energy generated by the regenerative braking system; and
   a circuit configured to feed into the battery at least a portion of the electrical energy stored in the bank of capacitors as a series of current pulses at a frequency corresponding to a resonant frequency of the battery,
   wherein the series of pulses comprises constructive resonant ringing that is constructive with respect to charging the battery.

16. The battery charging system of claim 15, wherein the capacitors are super-capacitors.

17. The battery charging system of claim 15, wherein the vehicle is an electric vehicle.

18. The battery charging system of claim 15, wherein the vehicle is a hybrid vehicle.

19. The battery charging system of claim 15, wherein the constructive resonant ringing comprises a decaying oscillation of current.

20. The battery charging system of claim 19, further comprising artificially enhancing the constructive resonant ringing in the series of current pulses.

21. The battery charging system of claim 15, wherein the battery comprises a primary battery.

22. The battery charging system of claim 15, wherein the battery comprises a secondary battery.

23. The battery charging system of claim 15, wherein the circuit is further configured to:
   feeding a first subset of the series of current pulses through the battery at the frequency during a first interval of time;
   providing a resting period of a duration where no current pulse is fed through the battery; and
   feeding a second subset of the series of current pulses through the battery at the frequency during a subsequent, second interval of time.

24. The battery charging system of claim 23, wherein has a duration that spans at least three consecutive current pulses in the first subset of the series of current pulses.

25. The battery charging system of claim 23, wherein the resting period has a duration that spans at least the same amount of time as the first interval of time.

26. The battery charging system of claim 15, wherein the series of current pulses is operated at a duty cycle of no more than 50%.

27. The battery charging system of claim 15, wherein feeding the series of current pulses comprises feeding the pulses at a frequency that is within 5% of the resonant frequency of the battery.

28. The battery charging system of claim 15, wherein the resonant frequency of the battery is a frequency at which the battery accepts electric charges at an optimal efficiency within a range of frequencies.

* * * * *